United States Patent [19]
Choi et al.

[11] Patent Number: 5,808,619
[45] Date of Patent: Sep. 15, 1998

[54] REAL-TIME RENDERING METHOD OF SELECTIVELY PERFORMING BUMP MAPPING AND PHONG SHADING PROCESSES AND APPARATUS THEREFOR

[75] Inventors: Seung-hak Choi, Sungnam; Kil-su Eo, Seoul, both of Rep. of Korea

[73] Assignee: Samsung Electronics Co., Ltd., Kyungki-do, Rep. of Korea

[21] Appl. No.: 748,489

[22] Filed: Nov. 8, 1996

[30] Foreign Application Priority Data

Nov. 9, 1995 [KR] Rep. of Korea ................. 95-40496

[51] Int. Cl.⁶ .................................................. G06F 15/00
[52] U.S. Cl. ............................................................ 345/426
[58] Field of Search ................................ 345/426, 421, 345/429, 430, 431, 432

[56] References Cited

U.S. PATENT DOCUMENTS 5,659,671  8/1997  Tannenbaum et al. ................. 395/126
5,673,374  9/1997  Sakaibara et al. ...................... 395/126

*Primary Examiner*—Phu K. Nguyen
*Attorney, Agent, or Firm*—Leydig, Voit & Mayer

[57] ABSTRACT

A real-time rendering method for selectively performing bump mapping and Phong shading processes and a rendering apparatus therefor are provided. The rendering method includes the step of calculating a ambient factor, the step of bump-mapping a diffuse factor and selectively outputting the bump-mapped diffuse factor or the diffuse factor prior to the bump mapping according to a bump mapping/Phong shading selection signal, the step of bump-mapping a specular factor and selectively outputting the bump-mapped specular factor or the specular factor prior to the bump mapping according to the bump mapping/Phong shading selection signal and the step of summing the ambient factor, the selectively output diffuse factor and the selectively output specular factor and obtaining the value of intensity. Therefore, bump mapping and Phong shading processes are selectively performed. Also, there is no discontinuity at the borders of each polygon. In addition, the rendering apparatus can be easily realized due to its simple structure.

8 Claims, 2 Drawing Sheets

REAL-TIME RENDERING METHOD OF SELECTIVELY PERFORMING BUMP MAPPING AND PHONG SHADING PROCESSES AND APPARATUS THEREFOR

BACKGROUND OF THE INVENTION

The present invention relates to a real-time rendering method of selectively performing bump mapping and Phong shading processes and an apparatus therefor.

Generally, the bump mapping apparatus is for expressing an object having a bumpy surface like the bark of a tree, which is similar to a texture mapping process in the aspect where basic contours of the object are expressed as a polygon in a modelling process and real world map data is used for a rendering process. However, according to the bump mapping process, the map data called a bump map is a geometrical data reflecting the degree of unevenness of a surface, and the intensity (or lightness) of each pixel of the polygon is calculated in accordance with the locational relationship between light and viewing sight in the present situation by extracting geometrical information of the bump map instead of simply overwriting the map data onto the polygon, thereby providing much more realistic picture than the texture mapping process.

Thus, according to the bump mapping process, a realistic uneven effect can be expressed using the bump map obtained from the real world, and the process is performed fast as less polygon is only used in the modeling process. Also, when the locational relationship between object, light and viewing sight is changed, the intensity of each protruding and depressed portion in the uneven surface is properly changed in each pixel.

As described above, each uneven portion is expressed by a shading effect. In most shading techniques such as Gouraud shading and Phong shading, the intensity of each pixel is determined according to the normal vector. From this aspect, James Blinn has suggested a bump mapping method based on a normal vector perturbation in which the normal vector of each pixel is changed in accordance with the bump map to provide the uneven effect. However, the bump mapping method suggested by Blinn can be applied only when the surface of an object has a functional relationship to a parametric surface, so that it is impossible to be applied to the polygon model which is mainly used in real world situation.

Recently, Ernst et al. has suggested a bump mapping method which can be applied to the polygon model by improving the above defect, on the basis of the normal vector perturbation method. However, this method has a defect in that the shading at each border line between polygons is discontinuous.

It is desirable to provide suitable hardware for performing real-time processing according to the bump mapping. However, there is no hardware in the present situation, other than a circuit suggested by Ernst. Ernst's circuit is difficult to implement due to its complicate structure. For example, if there is only one light source, two dot-product calculations of three-dimensional vector, twelve multiplication operations, five times of division operations, and two arctangent calculations should be performed with respect to each pixel. Also, due to the discontinuous shading at the border of the polygons, picture quality is lowered. Furthermore, a look-up table used should be recalculated when the relative position between the light source and the object changes, thereby decreasing a performance speed.

Also, Blinn's method has no consideration with respect to a hardware implementation, so that it is not suitable for obtaining the circuit. For example, for a partial-differential vector of the curved surface, at least two cross-product calculations with respect to three-dimensional vector, and calculation of the the length of three-dimensional vector should be performed with respect to each pixel.

SUMMARY OF THE INVENTION

It is an object of the present invention to provide a real-time rendering method of selectively performing bump mapping and Phong shading processes.

It is another object of the present invention to provide a rendering apparatus which adopts the above real-time rendering method.

To achieve the first object, there is provided a real-time rendering method of selectively performing bump mapping and Phong shading processes to obtain a value of intensity of an object, comprising the steps of: (a) calculating an ambient factor; (b) bump-mapping a diffuse factor and selectively outputting the bump-mapped diffuse factor or the diffuse factor prior to the bump mapping according to a bump mapping/Phong shading selection signal; (c) bump-mapping a specular factor and selectively outputting the bump-mapped specular factor or the specular factor prior to the bump mapping according to the bump mapping/Phong shading selection signal; and (d) summing the ambient factor from the step (a), the diffuse factor from the step (b) and the specular factor from the step (c) and obtaining the value of intensity of the object.

To achieve the second object, there is provided a real-time rendering apparatus of selectively performing bump mapping and Phong shading processes to obtain a value of intensity of an object, comprising: calculating means for obtain an ambient factor; first and second interpolating portions for performing a quadratic interpolation to obtain a diffuse factor and a specular factor, respectively; a third interpolating portion for performing the quadratic interpolation to obtain values of position within a map space of each pixel in a polygon; a bump map for outputting a normal vector corrected by the values of position within the map space of each pixel obtained from the third interpolating portion; a first vector dot-product operator for performing a dot-product operation to the diffuse factor with the normal vector corrected in the bump map and outputting a bump-mapped diffuse factor; a second vector dot-product operator for performing a dot-product operation to the specular factor with the normal vector corrected in the bump map and outputting a bump-mapped specular factor; a first multiplexer for selectively outputting the bump-mapped diffuse factor or the diffuse factor according to a bump mapping/Phong shading selection signal; a second multiplexer for selectively outputting the bump-mapped specular factor or the specular factor according to the bump mapping/Phong shading selection signal; an exponential operating portion for multiplying the specular factor output from the second multiplexer by a specular reflection exponent to output a final specular factor; and an adder for summing the ambient factor, the diffuse factor output from the first multiplexer, and the specular factor output from the exponential operating portion and obtaining the value of intensity of the object.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 2:
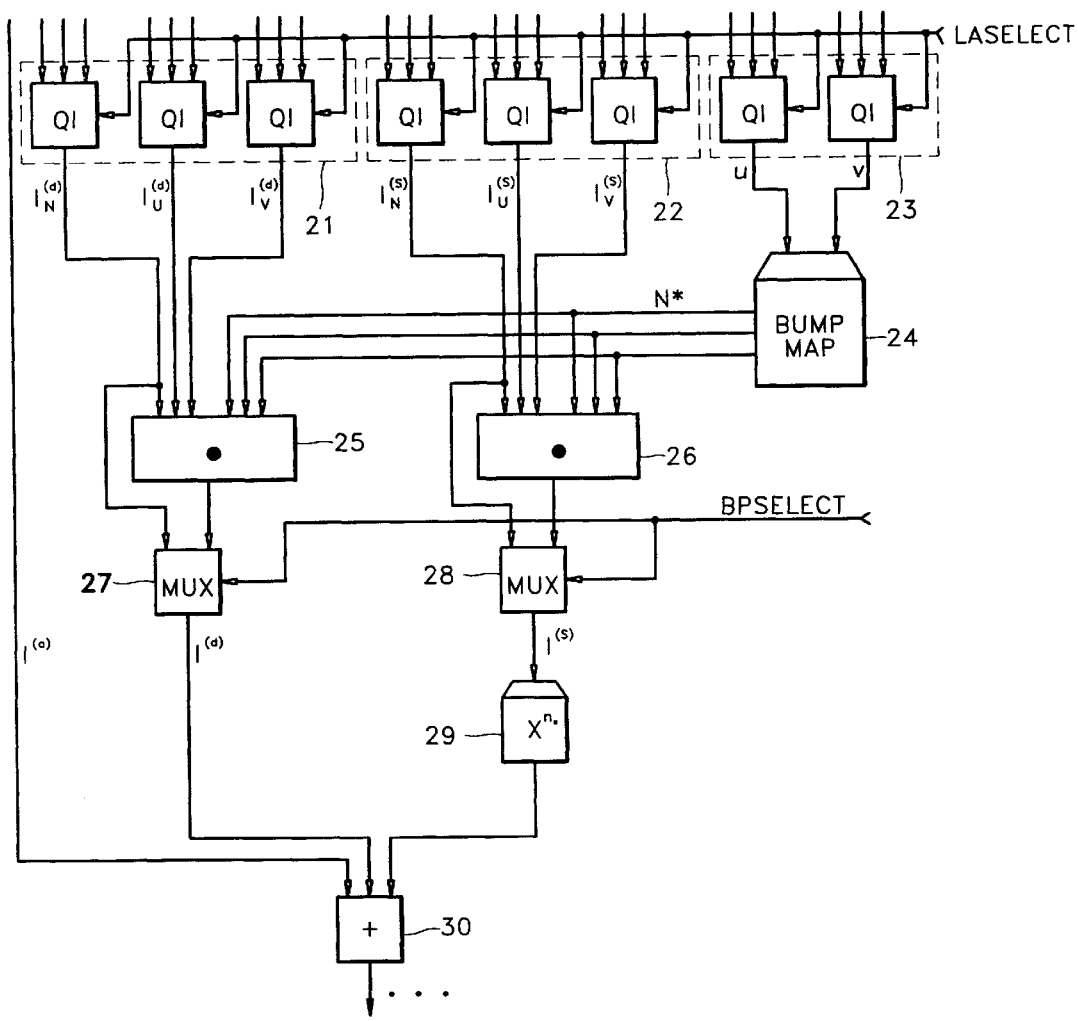
FIG. 2 is a block diagram of a real-time rendering apparatus for performing selectively bump mapping and Phong shading processes according to the present invention.

As shown in FIG. 2, a real-time rendering apparatus shown in FIG. 2 includes first to third interpolating portions 21 to 23, a bump map 24, first and second vector dot-product operators 25 and 26, first and second multiplexers 27 and 28, an exponential operator 29, and an adder 30.

Figure 3:
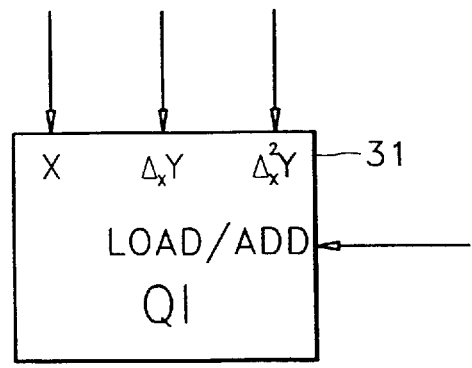
FIG. 3 is a structural diagram of the quadratic interpolator shown in FIG. 2.

FIG. 3 is a structural diagram of a quadratic interpolator (QI) shown in FIG. 2, which includes two accumulators (not shown).

The operation of the rendering apparatus will be described on the basis of the structure shown in FIG. 2.

According to Phong illumination model, intensity of an object located at an intended position is defined as following formula (1).

$$I = k_a \times I_a + \sum_{i=1}^{n} I_{l_i} k_d \times (N \cdot L_i) + \sum_{i=1}^{n} I_{l_i} k_s (N \cdot H_i)^{n_s} \quad (1)$$

where $H_i = (L_i + E)/|(L_i + E)|$.

In the formula (1), N represents a unit normal vector of the intended position, E represents a unit vector representing the direction of a view sight from the intended position, $L_i$ represents a unit vector representing the direction of ith light source at the intended position, $I_a$ represents the intensity of an ambient light source, $I_{Li}$ represents the intensity of ith light source, $k_a$ represents an ambient reflection coefficient, $k_d$ represents a diffuse reflection coefficient, $k_s$ represents a specular reflection coefficient, $n_s$ represents a specular reflection exponent and, x represents a diffused color of the object, respectively. On the other hand, each term of the formula (1) is called ambient, diffusion and specular factors, sequentially.

When an object having a curved surface is expressed as a set of polygons approximately, the normal vector of an arbitrary point inside the polygon is not determined. According to the Phong shading method, the normal vector at each vertex of the intended polygon is linear-interpolated in order to obtain the normal vector at arbitrary point inside the polygon.

Figure 1:
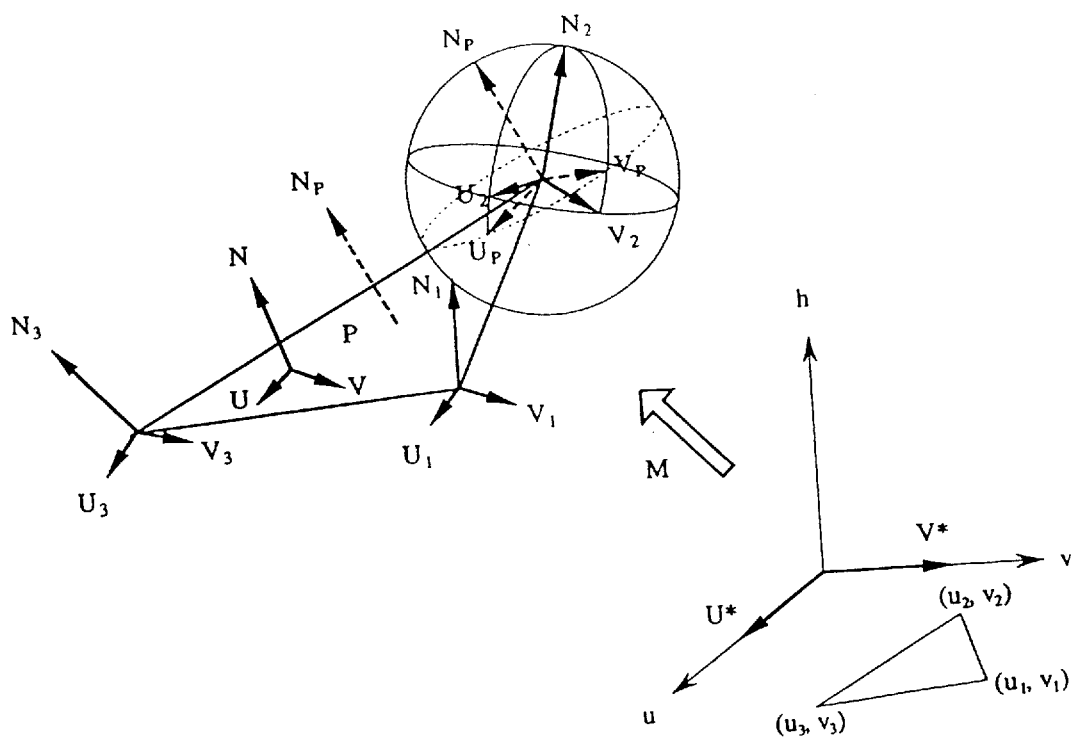
FIG. 1 is a diagram of illustrating an operational principle of the present invention, showing an example of a map space and an axis vector.

While the bump map used in the conventional bump mapping method has a height data, the bump map of the present invention has a unit normal vector. A space in which the bump map is defined is called a map space, and coordinates of this map space are represented by, u, v and h, respectively, as shown in FIG. 1. The height h of the protruding portion of the surface is determined according to the positions of u and v (here, u and v are integer). Here, the unit normal vector $N^* = (n^*_u, n^*_v, n^*_h)$ in the map space can be calculated using an image processing method. Also, these unit normal vectors are stored in the bump map B(u,v).

According to the bump mapping method of the present invention, each axial direction of the map space on the polygon is calculated and the unit normal vector $N^*$ is transformed according to the calculated axial direction.

If an affine transformation matrix for calculating the axial direction of the map space on the polygon is M, the matrix M is calculated as follows.

It is assumed that an input polygon P is a triangle and three-dimensional coordinate values $(x_i^{(w)}, y_i^{(w)}, z_i^{(w)})$ of each vertex and location of the bump map $(u_i, v_i)$ (here, $1 \leq i \leq 3$) is designated at each vertex i of the polygon P. When the normal vector $N_p$ of the polygon P and the h-axis of the map space are matched, the matrix M satisfies the condition of the following formula (2).

$$(u_i, v_i, 0, 1)M = (x_i^{(w)}, y_i^{(w)}, z_i^{(w)}, 1), i=1,2,3 \quad (2)$$

The matrix M satisfying the above condition of formula (2) can be obtained by solving a system of linear equations.

The unit vectors of two axial directions in the map space are called $U^* = (1, 0, 0)$ and $V^* = (0, 1, 0)$, respectively. After transforming these unit vectors into homogeneous coordinates, the result is multiplied by the matrix M, thereby obtaining vectors $U_p$ and $V_p$ of the axial directions in the polygon P. However, $N_p$ and given normal vector $N_i$ at each vertex i are not matched each other. Thus, h-axis is matched with $N_i$ and then, $U_p$ and $V_p$ are projected on a surface perpendicular to $N_i$. The transformation of the projected vectors into the unit vectors are represented by $U_i$ and $V_i$ as shown in FIG. 1, which are called axial vectors. These axial vectors are calculated for each vertex.

On the other hand, when performing Phong shading process, the given normal vectors at each vertex are linearly-interpolated to calculate normal vector N at each pixel located inside the polygons. According to the present invention, for the purpose of the bump mapping, the axial vectors calculated at each vertex are linearly interpolated, which are called U and V, respectively. The vectors N, U and V are not unit vectors in general since they are calculated by linear interpolation. In practical applications, however, the difference of the normal vectors $N_i$ at every vertex of the polygon P is small, and also the same is true of the vectors $U_i$ and $V_i$. This implies that the length of N, U and V are approximately one. In what follows, therefore, the vectors N, U and V are assumed to be unit vectors. Then, a normal vector N' corrected by the bump map B(u, v) corresponding to (u,v) values of each pixel is expressed as following formula (3).

$$N' = n^*_u U + n^*_v V + n^*_h N \quad (3)$$

The normal vector N' corrected by the above formula (3) is applied to each factor of the formula (1). First, the ambient factor $I^{(a)}$ as a constant value is easily processed. On the other hand, the diffuse factor $I^{(d)}$ is processed as following formula (4).

$$\begin{aligned} I^{(d)} &= \sum_{i=1}^{n} I_{l_i} k_d \times (N' \cdot L_i) \\ &= \sum_{i=1}^{n} I_{l_i} k_d \times (n^*_u U + N^*_v V + n^*_h N) \cdot L_i \\ &= n^*_u \sum_{i=1}^{n} I_{l_i} k_d \times (U \cdot L_i) + n^*_v \sum_{i=1}^{n} I_{l_i} k_d \times \\ &\quad (V \cdot L_i) + n^*_h \sum_{i=1}^{n} I_{l_i} k_d (N \cdot L_i) \end{aligned} \quad (4)$$

Here, if $$I_X^{(d)} = \sum_{i=1}^{n} I_{l_i} k_d \times (X \cdot L_i),$$

the formula (4) can be arranged with a dot-product form of the vector such as following formula (5).

$$I^{(d)} = N^* \cdot (I_U^{(d)}, I_V^{(d)}, I_N^{(d)}) \quad (5)$$

In the above formula (5), $I_N^{(d)}$ is the same as the diffuse factor prior to the bump mapping, $I_U^{(d)}$ and $I_V^{(d)}$ are the same as the diffuse factors calculated by regarding U and V as the normal vectors. Thus, these values $I_U^{(d)}$ and $I_V^{(d)}$ can be calculated in the same manner as the method of calculating $I_N^{(d)}$. That is, any method of calculating the diffuse factor for the Phong shading process may be used for the calculation of these values.

Also, the specular factor $I^{(s)}$ can be expressed as following formula (6) by the same calculating method.

$$I^{(s)} = \sum_{i=1}^{n} (N^* \cdot (I_U^{(s)}, I_V^{(s)}, I_N^{(s)}))^{n_s} \qquad (6)$$

Here, $I_X^{(s)} = (I_1 k_s)^{1/2} {}_s(X \cdot H_1)$. In this case, any method of calculating the specular factor for the Phong shading process may be used for calculating $I_X^{(s)}$.

The rendering apparatus which operates in the above described manner will be described with reference to FIG. 2.

First, it is assumed that light is illuminated in parallel from one light source. That is, the number of light sources n is equal to 1 and direction $L_i$ toward the light source is the same in the same polygon.

In order to drive the rendering apparatus, the process therefor is roughly classified into a modeling step for generating three-dimensional polygon model by a user, a geometry engine processing step for transforming the generated polygon model onto a position on a screen, and a raster engine processing step for performing an operation by pixel being on the screen and storing the result in a frame buffer. First, the operations required for the former two steps will be described prior to the operation of the raster engine processing step.

First, in the modeling step, the user prepares proper data in advance so as to drive the rendering apparatus. In this step, it is assumed that the objects are modeled as polygons and the polygons are all triangles. For the Phong shading process, normal vector is assigned to every vertex. For the bump mapping process, $(u_i, v_i)$ value is assigned to every vertex other than the normal vector and the axial vector is calculated using the assigned $(u_i, v_i)$ value, and then the result is stored in the model. However, more than one triangle may share a vertex, and the axial vector calculated in the aspect of each triangle may be different. In this case, the average of the axial vectors to each triangle is calculated and the n stored in the model.

Then, in the geometry engine step, Bishop and Weimer have suggested a hardware implementation for the Phong shading, where Taylor series expansion and quadratic interpolation are performed. That is, after calculating the diffuse factor value and specular factor value at three vertices of the triangle using the above formula (1), the calculated values are quadratic-interpolated with respect to the coordinate values of the screen inside the polygon in the raster engine processing step. By modifying the above, following formula (7) is obtained due to six coefficients of the quadratic equation.

$$I_N^{(d)} = T_5 x^2 + T_4 xy + T_3 y^2 + T_2 x + T_1 y + T_0 \qquad (7)$$

In the above formula (7), x and y represents coordinates of the screen. By solving the system of linear equations derived by substituting the diffuse factor values at three vertices and intermediate points on the edges of the triangle, the coefficients of the formula (7) can be obtained. In the raster engine processing step, forward difference is calculated using the coefficients, so that the diffuse factor values can be calculated through twice adding processes at the adjacent pixels. Also, the specular factor value can be calculated in the same manner.

The above described method related with the formula (7) can be used as it is for calculating the above formulas (5) and (6). That is, $I_N^{(d)}, I_U^{(d)}, I_V^{(d)}, I_N^{(s)}, I_U^{(s)}, I_V^{(s)}$ are calculated at three vertices and the intermediate points on each edge in the triangle, thereby obtaining the solutions of the system of linear equation. Here, the result is expressed as the quadratic equation like the formula (7), thereby obtaining coefficients of the quadratic equation.

In the geometry engine processing step, span is generated with respect to each triangle and each span is transferred to the raster engine. Also, $I_N^{(d)}, I_U^{(d)}, I_V^{(d)}, I_N^{(s)}, I_U^{(s)}, I_V^{(s)}$ are calculated at the starting point of each span using the quadratic equation of the formula (7). Then, the result is transferred to the raster engine as an input value thereof. Also, for the quadratic interpolation, as x-coordinate value increases by 1, the increment of $I_N^{(d)}, I_U^{(d)}, I_V^{(d)}, I_N^{(s)}, I_U^{(s)}, I_V^{(s)}$, that is, $\Delta_x I_N^{(d)}, \Delta_x I_U^{(d)}, \Delta_x I_V^{(d)}, \Delta_x I_N^{(s)}, \Delta_x I_U^{(s)}, \Delta_x I_V^{(s)}$, and the increment of $\Delta_x I_N^{(d)}, \Delta_x I_U^{(d)}, \Delta_x I_V^{(d)}, \Delta_x I_N^{(s)}, \Delta_x I_U^{(s)}, \Delta_x I_V^{(s)}$, that is, $\Delta_x^2 I_N^{(d)}, \Delta_x^2 I_U^{(d)}, \Delta_x^2 I_V^{(d)}, \Delta_x^2 I_N^{(s)}, \Delta_x^2 I_U^{(s)}, \Delta_x^2 I_V^{(s)}$ are calculated at the starting point of each span, and the result is transferred to the input of the raster engine.

For calculating (u,v) value of each pixel in the screen, the quadratic interpolation used in the texture mapping is used. Here, the quadratic interpolation coefficient is required, which is calculated with respect to u and v in the same manner as above and then transferred to the input of the raster engine.

Then, in the raster engine processing step, a circuit for performing the bump mapping will be described with reference to FIGS. 2 and 3.

When LOAD/ADD control signal LASELECT is in the LOAD state at the quadratic interpolator (QI) of the first to third interpolating portions 21 to 23, Y and $\Delta_x Y$ are stored in two accumulators, respectively. On the other hand, in the ADD state, $\Delta_x^2 Y$ is added to $\Delta_x Y$ and then the result is added to Y. Here, Y is one of $I_N^{(d)}, I_U^{(d)}, I_V^{(d)}, I_N^{(s)}, I_U^{(s)}, I_V^{(s)}$, u and v, and data input to each quadratic interpolator (QI) of the first to third interpolating portions 21 to 23 are Y, $\Delta_x Y$ and $\Delta_x^2 Y$.

The bump map 24 is to store the unit normal vector N* in map space. The unit normal vector N* is obtained in the bump map 24 using (u,v) value of the present pixel. One pixel of the bump map 24 is constituted of three bytes and each byte corresponds to each component value of the unit normal vector.

The first vector dot-product operator 25 performs the vector dot-product operation with respect to the unit normal vector N* obtained in the bump map 24 and the output $I_N^{(d)}$, $I_U^{(d)}, I_V^{(d)}$ of the quadratic interpolator (QI) of the first interpolating portion 21. The second vector dot-product operator 26 performs the vector dot-product operation with respect to the unit normal vector N* obtained in the bump map 24 and the output $I_N^{(s)}, I_U^{(s)}, I_V^{(s)}$ of the quadratic interpolator (QI) of the second interpolating portion 22. The first and second vector dot-product operators 25 and 26 are composed of three multipliers and one adder, respectively.

The first multiplexer 27 outputs one of the output from the first vector dot-product operator 25 and $I_N^{(d)}$ from the first interpolating portion 21, according to a bump mapping/Phong shading selection signal (BPSELECT). The second multiplexer 28 outputs one of the output from the second vector dot-product operator 26 and $I_N^{(s)}$ from the second interpolating portion 22, according to a bump mapping/Phong shading selection signal (BPSELECT).

Also, in the case of the specular factor, the exponential operator 29 in which the exponential operation is performed with respect to the output from the second multiplexer 28 is implemented by a look-up table. Here, the exponential operator 29 is expressed as $X^{n_s}$, in FIG. 2.

The adder 30 adds the ambient factor, the diffuse factor from the first multiplexer 27 and the specular factor from the exponential operator 29, and outputs the result.

Since the rendering apparatus shown in FIG. 2 has a simple structure compared with the circuit suggested by Ernst et al., the rendering apparatus can be easily realized. Also, only $I_N^{(d)}$ and $I_N^{(s)}$ are used as the hardware for the Phong shading. Here, only Phong shading mode can be performed separately as well as the bump mapping mode using $I_N^{(d)}$ and $I_N^{(s)}$. That is, if only Phong shading is required, the rendering apparatus can be used through mode switching by the first and second multiplexers 27 and 28. Here, the mode switching is controlled by a BPSELECT signal.

The bump map 24 and the exponential operator 29 of the rendering apparatus shown in FIG. 2 use a memory so as to store the look-up table therein.

The above described principle in operation is applied to the polygon model which is mainly used in the actual situation. Also, according to the above method, the same axial vector is used at the boundary between triangles, so that the boundary between triangles is continuously shaded.

As described above, according to real-time rendering method and apparatus for selectively performing the bump mapping and the Phong shading of the present invention, uneven surface of the object can be expressed, so that the reality of the picture can be improved if the rendering apparatus is applied to the real-time three-dimensional animation. Also, the rendering apparatus can be applied to the polygon model which is widely used in the actual situation, thereby proving great utility. Also, there is no discontinuity at the borders of each polygon. In addition, the rendering apparatus can be easily realized due to its simple structure. Further, the Phong shading may be selectively performed and may be performed in separate if required.

What is claimed is:

1. A real-time rendering method of selectively performing bump mapping and Phong shading processes to obtain a value of intensity of an object, comprising the steps of:

(a) calculating an ambient factor;

(b) bump-mapping a diffuse factor and selectively outputting the bump-mapped diffuse factor or the diffuse factor prior to the bump mapping according to a bump mapping/Phong shading selection signal;

(c) bump-mapping a specular factor and selectively outputting the bump-mapped specular factor or the specular factor prior to the bump mapping according to the bump mapping/Phong shading selection signal; and (d) summing the ambient factor from said step (a), the diffuse factor from said step (b) and the specular factor from said step (c) and obtaining the value of intensity of the object viewed from an arbitrary location in said raster engine portion.

2. A real-time rendering method as claimed in claim 1, wherein the diffuse factor in said step (b) is bump-mapped by following equations:

$$N'=n^*_u U+n^*_v V+n^*_h N$$

(here, N' denotes a normal vector corrected by a bump map B(u, v) corresponding to (u,v) values of each pixel, $n^*_u$, $n^*_v$ and $n^*_h$ denote components of unit normal vector in a map space, N denotes normal vectors given at each vertex calculated by linear interpolation, and U and V denote axial vectors given at each vertex calculated by linear interpolation);

$$I^{(d)}=N^* \cdot (I_U^{(d)}, I_V^{(d)}, I_N^{(d)})$$

(here, $I^{(d)}$ denotes the bump-mapped diffuse factor, $I_N^{(d)}$ denotes the diffuse factor prior to the bump mapping, $I_U^{(d)}$ and $I_V^{(d)}$ denote the diffuse factors calculated by regarding U and V as the normal vectors).

3. A real-time rendering method as claimed in claim 1, wherein the specular factor in said step (c) is bump-mapped by following equations:

$$N'=n^*_u U+n^*_v V+n^*_h N$$

(here, N' denotes a normal vector corrected by a bump map B(u, v) corresponding to (u,v) values of each pixel, $n^*_u$, $n^*_v$ and $n^*_h$ denote components of unit normal vector in a map space, N denotes normal vectors given at each vertex calculated by linear interpolation, and U and V denote axial vectors given at each vertex calculated by linear interpolation);

$$I^{(s)} = \sum_{i=1}^{n} (N^* \cdot (I_U^{(s)}, I_V^{(s)}, I_N^{(s)}))^{n_s}$$

(here, $I^{(s)}$ denotes the bump-mapped specular factor, $I_N^{(s)}$ denotes the specular factor prior to the bump mapping, $I_U^{(s)}$ and $I_V^{(s)}$ denote the specular factors calculated by regarding U and V as the normal vectors).

4. A real-time rendering method as claimed in claim 1, wherein a bump map used for the bump mapping process stores a unit normal vector of a map space.

5. A real-time rendering apparatus for selectively performing bump mapping and Phong shading processes to obtain a value of intensity of an object, comprising:

calculating means for calculating an ambient factor;

first and second interpolating portions for performing a quadratic interpolation to obtain a diffuse factor and a specular factor, respectively;

a third interpolating portion for performing a quadratic interpolation to obtain values of position within a map space of each pixel in a polygon;

a bump map for outputting a normal vector corrected by the values of position within the map space of each pixel obtained from said third interpolating portion;

a first vector dot-product operator for performing a dot-product operation to the diffuse factor with the normal vector corrected in said bump map and outputting a bump-mapped diffuse factor;

a second vector dot-product operator for performing a dot-product operation to the specular factor with the normal vector corrected in said bump map and outputting a bump-mapped specular factor;

a first multiplexer for selectively outputting said bump-mapped diffuse factor or said diffuse factor according to a bump mapping/Phong shading selection signal;

a second multiplexer for selectively outputting said bump-mapped specular factor or said specular factor according to the bump mapping/Phong shading selection signal;

an exponential operating portion for multiplying the specular factor output from said second multiplexer by a specular reflection exponent to output a final specular factor; and an adder for summing the ambient factor, the diffuse factor output from said first multiplexer, and the specular factor output from said exponential operating portion and obtaining the value of intensity of the object.

6. A real-time rendering apparatus as claimed in claim 5, wherein said first interpolating portion performs the quadratic interpolation to obtain the diffuse factor prior to the bump mapping process at each pixel inside the polygon in which the interpolation input is derived from normal vectors given at each vertex of the polygon and axial vectors calculated at each vertex of the polygon.

7. A real-time rendering apparatus as claimed in claim 5, wherein said second interpolating portion performs the quadratic interpolation to obtain the specular factor prior to the bump mapping process at each pixel inside the polygon in which the interpolation input is derived from normal vectors given at each vertex of the polygon and axial vectors calculated at each vertex of the polygon.

8. A real-time rendering apparatus as claimed in claim 5, wherein the Phong shading function is performed by outputting the diffuse factor prior to the bump mapping and the specular factor prior to the bump mapping in said first and second multiplexers, respectively.

* * * * *